United States Patent [19]
Mathesius et al.

[11] 3,963,483
[45] June 15, 1976

[54] DIRECT REDUCTION STEELMAKING PROCESS

[75] Inventors: Walther H. Mathesius, Beaver; Somerled Macdonald, Sewickley, both of Pa.

[73] Assignee: Koppers Company, Inc., Pittsburgh, Pa.

[22] Filed: Nov. 19, 1973

[21] Appl. No.: 417,272

Related U.S. Application Data

[63] Continuation-in-part of Ser. No. 233,446, March 10, 1972, abandoned.

[52] U.S. Cl................................ 75/11; 75/33; 75/38
[51] Int. Cl.².................. C21C 5/52; C21B 13/02
[58] Field of Search.............. 75/9, 11, , 26, 34, 75/33, 38

[56] References Cited
UNITED STATES PATENTS

| | | | |
|---|---|---|---|
| 2,894,831 | 7/1959 | Old | 75/26 |
| 3,140,168 | 7/1964 | Halley | 75/11 |
| 3,163,520 | 12/1964 | Collin | 75/38 |
| 3,392,008 | 7/1968 | Ward | 75/26 |
| 3,392,218 | 7/1968 | Kalina | 75/26 |
| 3,637,368 | 1/1971 | Bessant | 75/26 |
| 3,758,290 | 9/1973 | Kibby | 75/10 |

*Primary Examiner*—P. D. Rosenberg
*Attorney, Agent, or Firm*—Sherman H. Barber; Olin E. Williams; Oscar B. Brumback

[57] ABSTRACT

Molten steel is continually and directly made within the bath of a metallurgical furnace by the rapid reduction of iron compounds through their reaction with carbonaceous fines continually injected below the molten metal surface. Heat for the process in one instance is supplied mainly by electric arc. The iron compounds may preferably also be injected. Flux materials are also continually fed to the surface, and molten steel and slag are continually tapped from the bath. In order to augment the economics of the process, the carrier gas for injection may be a reducing gas, such as steam-reformed natural gas, and the furnace off-gas may be used to preheat and partially reduce the feed compounds.

18 Claims, 3 Drawing Figures

DIRECT REDUCTION STEELMAKING PROCESS

CROSS REFERENCE TO RELATED APPLICATION

This application is a continuation-in-part of co-pending application, Ser. No. 233,446, filed Mar. 10, 1972, and now abandoned.

BRIEF SUMMARY OF THE INVENTION

Iron oxides and iron compounds other than iron oxides in particulate form are preferably, though not necessarily, preheated and partially reduced in a counter-current, gas-solids contacting apparatus and hot, partially reduced iron oxides are then entrained in a carrier gas which may be air, natural gas, carbon monoxide, hydrogen or the like. The gas carries the entrained material and fine particulate carbon, which is, in some instances, injected into the gas stream flowing toward a metallurgical furnace, which may be an electric arc furnace, into which the gas and the entrained particulate material is injected. In some instances the fine particulate carbon may be injected separately into the furnace.

Within the furnace there is a pool of molten metal and the particulate carbon dissolves in the molten metal, it is believed, and then reduces the particles of iron oxides or iron compounds as they come into intimate contact with the iron-carbon solution, whereby a continuous reduction of such iron materials is carried out and steel is continually produced.

For a further understanding of the invention and for features and advantages thereof, reference may be made to the following description and the drawing which illustrates a preferred embodiment of equipment in accordance with the invention which is suitable for practicing the method of the invention, and other embodiments thereof.

DETAILED DESCRIPTION

Figure 1:
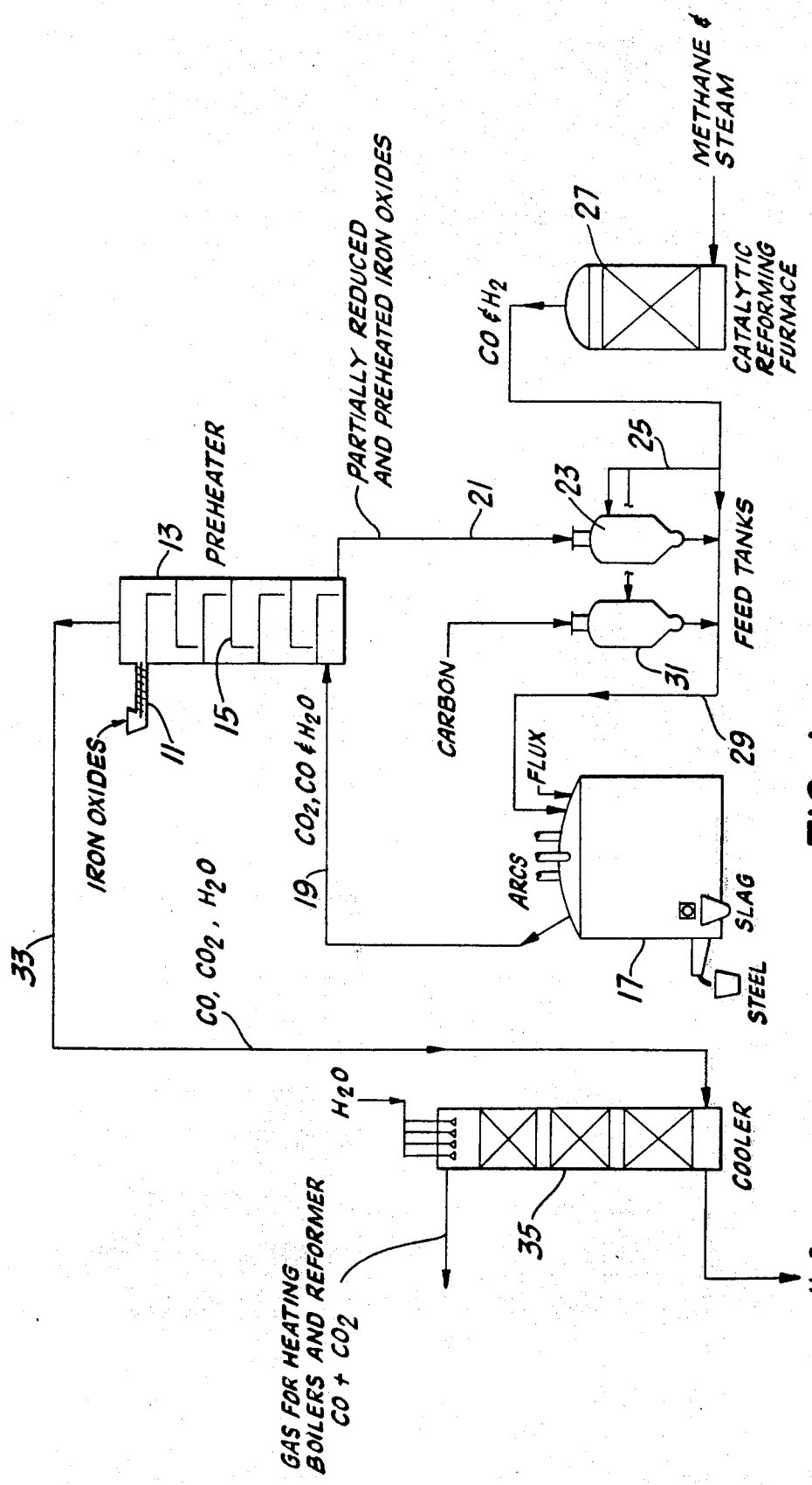
FIG. 1 is a schematic arrangement of apparatus suitable for carrying into practice a first embodiment of the method of the invention.

FIG. 1 illustrates schematically one embodiment of apparatus that is suitable for carrying into practice the method of the invention. It is contemplated that the method of the invention may be carried into practice using naturally occurring iron compounds, like iron oxides, but it is to be understood that the method can also be carried into practice using naturally occurring iron compounds other than iron oxides, such as iron carbonate ore and partially processed naturally occurring iron compounds such a finely divided concentrate. The process of the invention is also eminently suitable for converting certain other materials directly into steel, which materials are not naturally occurring, such as BOF dust, iron blast furnace dust, steelmill roll scale, and the like. Hereinafter, the term "iron oxides" is intended to include all of the iron compounds mentioned herein.

To begin with, iron oxides are introduced, as at 11, into a countercurrent, gas-solid contacting apparatus 13 of conventional form. One type of suitable apparatus 15, containing several compartments or trays, is shown in FIG. 1.

As shown in FIG. 1, hot gases emanating from an electric arc furnace 17 flow in conduit 19 into the apparatus 13 at or near the bottom, and then upwardly therein. As the gases, which are mostly carbon monoxide, rise in the apparatus 13, they are cooled by contact with the downwardly moving solid iron oxides. Cooler temperatures favor the reduction reaction with carbon monoxide, but they also reduce the reaction rate. Consequently, some of the carbon monoxide reacts with the iron oxides.

The gases leaving the apparatus 13 are mostly carbon monoxide, carbon dioxide and water, with some smaller amount of hydrogen and traces of other gases present. The ratio of carbon monoxide to carbon dioxide would probably be between one and two. The solids discharged at the bottom of the apparatus 13 are preheated, partially reduced iron oxides.

If the carrier gas, as described hereinafter, is air instead of reducing gas, there would be some nitrogen, very little water, and probably no hydrogen mixed with the carbon monoxide and carbon dioxide.

The hot, partially reduced iron oxides are carried away from the apparatus 13 by means of a conventional conduit, or enclosed flight conveyor, or the like, and they discharge into a feed tank or other suitable container 23. Within the feed tank 23, the iron oxides are mixed with hot carrier gases that flow thereinto through conduit 25 from a catalytic reforming furnace 27.

Natural gas, containing mostly methane, and steam are introduced into the catalytic refining furnace 27 and carbon monoxide and hydrogen emerge from the furnace and flow in the conduit 25. The partially reduced iron oxides emerge from the feed tank 23 into conduit 29 wherein the carrier gas carries them and fine particulate carbon, which is disposed in and flows from another feed tank 31, into the electric arc furnace 17. Another suitable heat source is an electric induction furnace. The carrier gas is about 75 percent (volume) hydrogen and 25 percent (volume) carbon monoxide.

The electric arc furnace 17 is employed initially to melt scrap to form a pool of molten metal in the bottom of the furnace. When the reacting materials, that is carbon and the partially reduced and preheated iron oxides, enter the furnace and contact the molten metal, they react with each other. It is believed that the fine particulate carbon dissolves in the molten metal, and the iron oxides are thereafter reduced as they come into contact with the iron-carbon solution. It is desirable to so maintain the carbon, iron oxide balance that the body of the melt contains the correct carbon analysis for the desired grade of steel. The fine particulate carbon is, preferably, under 10 mesh in particle size.

The introduction of the fine particulate carbon into the melt, by forceably injecting such fine particles in order to obtain a high solution rate, is a significant feature of the present invention. But, the introduction of iron oxides in this manner, though ideal, is not practical in all cases. When the iron oxides are already in the finely divided state, such as concentrates made from low-grade ores, or the iron-bearing dust mentioned herein, injecting iron oxides by fluidized means is an excellent method. However, it might be impractical to grind direct-shipping ores to sizes small enough for direct injection by fluidized means. Therefore, ores existing in comparatively large lumps might be introduced by other well-known mechanical means.

The net heat effect from the reaction between the fine solid particulate carbon and the solid iron oxides to make liquid iron, carbon monoxide and some carbon dioxide is endothermic. Hence, this reaction is, according to the method of our invention, carried out preferably in the electric arc furnace 17, and the heat produced by the electric arc is used to enhance the endothermic reaction mentioned.

It is desirable to use a gas other than air as the carrier, because it replaces the nitrogen in the air with a useful reductant. The fact that the reaction between hydrogen and iron oxides is endothermic makes it more likely to occur at high furnace temperatures than that with carbon monoxide, which is exothermic. Therefore, it is also desirable to use a gas rich in hydrogen and low in carbon monoxide, because the carbon monoxide is largely wasted in the furnace due to the equilibrium conditions existing at high temperatures. However, the heat from the electric arc is used mostly to sustain the endothermic reaction between the carbon-iron solution and the iron oxides, to melt the end products, and to heat them to the required temperature.

Flux is introduced as may be necessary in the direction of the labeled arrow, and slag and steel are continuously tapped from the furnace; the slag flowing into one receptacle and the steel into another receptacle. It is to be understood, however, that in some instances it may be desirable to hold some slag and steel in the furnace for an indefinite period of time while feeding the furnace with carbon, iron oxides and flux.

It is recognized that in some instances it may be desirable to inject the fine particulate carbon, the iron oxides, and the flux under gaseous pressure through a single lance, as described hereinafter, or separately as described hereinbefore.

Since the electric arc heat, the quantity, and the rate of flow of both the iron oxides and the carbon are each separately and individually controllable, steel or iron of any desired carbon content can be made under our process technique, simply by adjusting the relative proportions of carbon and iron oxides, and by adjusting the bath temperature by varying the heat of the electric arc.

That the arc temperature and total solids feed rate can be quickly and readily adjusted makes our process ideal for the continuous making of steel.

As mentioned previously herein, the particle size of the carbon is, preferably less than 10 mesh size. The process of the present invention is carried into practice at atmospheric pressure, or not more than one-half inch water column pressure greater or less than atmospheric pressure. As for the temperature of the metal bath in the furnace, it can be within the range of 2750° to 3100° F.

The average feed rates of carbon, flux and iron oxides depends upon the size and the production capacity of the apparatus, and also upon the purity or impurity of these materials. Typical ranges of flow rates of carbon, flux and iron oxides are given in the following Table I, for an ore or other iron oxide material of 60–65 percent iron content and 2 to 3 percent silica, for a flux of 95 percent CaO content, and for a reductant of 98 percent carbon content:

TABLE I

| Steelmaking Capacity - Net tons per day | Flow rate - pounds per hour | | |
|---|---|---|---|
| | Carbon | Flux | Iron oxide |
| 100 | 4,000–5,000 | 1,000–1,100 | 13,000–14,000 |
| 500 | 20,000–25,000 | 5,000–6,000 | 65,000–70,000 |
| 1000 | 40,000–50,000 | 10,000–11,000 | 130,000–140,000 |

The top gases emanating from the apparatus 13 flow in conduit 33 into a conventional gas cooler 35, and the top gases comprise mostly carbon monoxide, carbon dioxide and water vapor. In the gas cooler 35, most of the water is removed by condensation; carbon monoxide emanating therefrom is used as fuel to make steam for reforming, and to supply heat for the reforming reaction.

Cooling water is introduced into the top of the gas cooler 35, as indicated by the arrow, and heated water flows from the gas cooler at the bottom. It is recognized that a little hydrogen is present in the gases entering the gas cooler, and that the gases leaving the cooler contain a little hydrogen, as well as the compounds indicated in the drawing.

In like manner, a little hydrogen and some water, as well as carbon monoxide, enter the preheater at the bottom.

Figure 2:
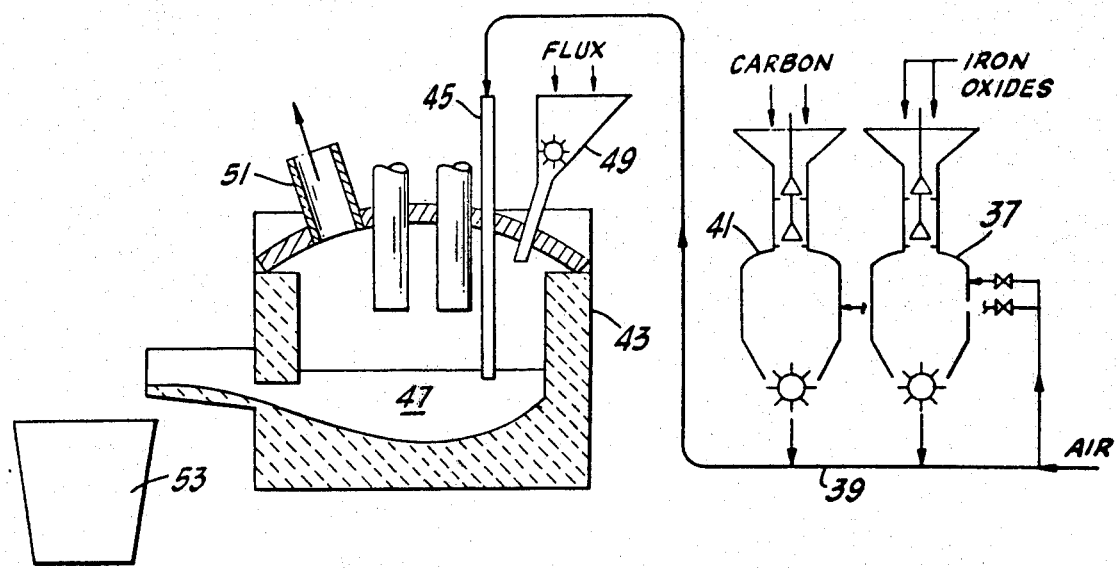
FIG. 2 is a schematic arrangement of apparatus suitable for carrying into practice a second embodiment of the method of the invention.

FIG. 2 illustrates a simplified arrangement of equipment that is suitable for carrying into practice the method of the invention.

Like the apparatus shown in FIG. 1, iron oxides are contained in a receptacle 37, and air is used to pressurize such receptacle, as well as to carry the iron oxides through conduit 39. Another receptacle 41 that is similar to the receptacle 37 is pressurized with air in the same way, and fine particulate carbon in such receptacle 41 is also carried in the conduit 39 by air.

The fine particulate carbon and the iron oxide are introduced into an electric furnace 43 through a lance 45, or in any other suitable manner, and the injected material reacts with a bath of molten metal 47 in the manner suggested previously herein.

Flux is or may be introduced into the electric furnace through a funnel device 49, or in any other preferred manner.

The parameters of particle size, temperatures, pressures and flow rates, expressed herein previously, apply in this instance also.

It should be recognized that the fine particulate carbon, the iron oxides and the flux (for example, powdered calcium oxide) may be injected under gaseous pressure into the electric arc furnace through the lance 45, or separately, as described herein.

Gases which evolve due to the reaction of the molten metal (iron), with carbon and the iron oxides are mostly carbon monoxide and nitrogen. These gases flow out of the electric furnace via a conduit 51 and may be further processed in any suitable manner, for any desired purpose.

Molten steel and slag may be continuously, or from time to time, tapped from the furnace 43 into a ladle 53, and thereafter the molten steel may be used in a normal manner.

Figure 3:
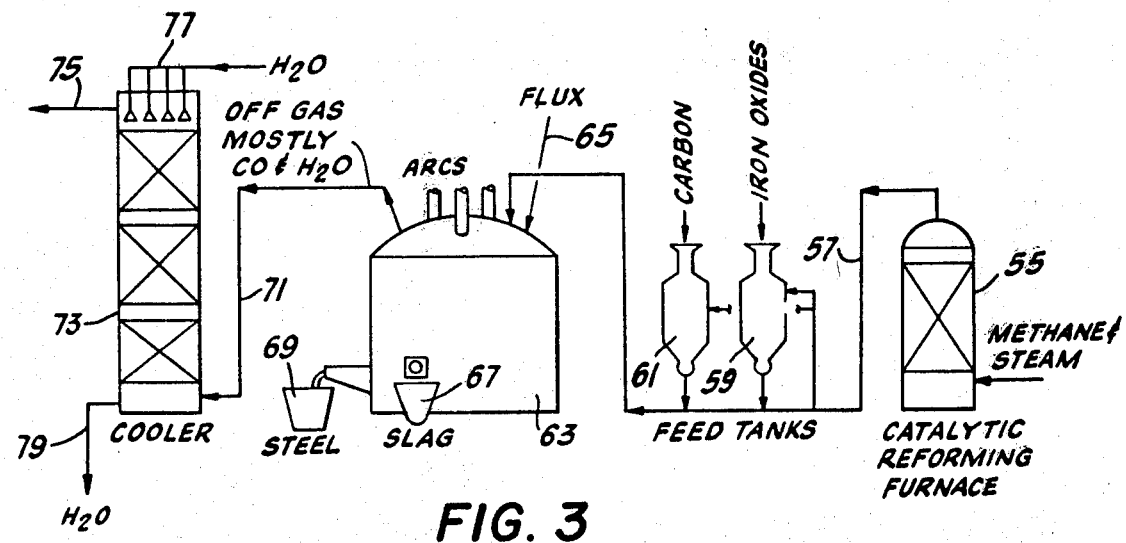
FIG. 3 is a schematic arrangement of apparatus suitable for carrying into practice a third embodiment of the method of the invention.

The arrangement of apparatus shown in FIG. 3 is an improvement over that shown in FIG. 2 and it is also suitable for carrying into practice the method of the invention under the same parameters.

Natural gas, which contains mostly methane, and steam are introduced into a conventional catalytic reforming furnace 55, and carbon monoxide and hydrogen emerge from the furnace and flow in a conduit 57. Iron oxides that are disposed in a receptacle 59, and fine particulate carbon that is disposed in another receptacle 61, both of which receptacles are pressurized by the gases evolving from the reforming furnace 55, flow in the conduit 57 into an electric arc furnace 63.

The carrier gas evolving from the catalytic furnace is about 75 percent (volume) hydrogen and about 25 percent (volume) carbon monoxide, and is not diluted by a relatively large percentage of nitrogen. As in the description of FIG. 1, the hydrogen is more likely to reduce the iron oxides at the high temperatures prevailing within the electric furnace than is carbon monoxide.

Within the electric arc furnace 63 there is a bath of molten metal, and it is believed that the same reaction occurs therein as is mentioned previously in the description of FIG. 1.

Flux is or may be introduced into the electric arc furnace 63 through a conduit 65, and slag is tapped continuously, or from time to time, into a receptacle 67. Also, molten steel is tapped continuously, or from time to time, into another receptacle 69.

The resulting reaction between the fine solid particulate carbon and the solid iron oxides to make liqud iron, carbon monoxide and some carbon dioxide is endothermic. Hence, this reaction is, according to the method of the invention, carried out preferably in an electric arc furnace, since the heat of the arc is a readily available source to enhance the reaction must mentioned.

The gases evolving from the electric arc furnace are mostly carbon monoxide and water vapor which flow in conduit 71 into a conventional gas cooler 73. In the gas cooler most of the water vapor is removed by condensation and the cooled gases, mostly carbon monoxide and some hydrogen, flow from the gas cooler 73 in conduit 75, and are made use of at another location.

Cooling water is introduced into the gas cooler at the top 77 and heated water emerges from the bottom in conduit 79.

From the foregoing description of the several embodiments of the invention, those skilled in the art should recognize many important features and advantages of it, among which the following are particularly significant:

The iron-bearing materials, and the iron oxides previously mentioned herein, can be in finely divided form and they need not be specially prepared, as is customary, by a sintering or a pelletizing process;

The carbon would not have to be in the form of coke as used in a conventional blast furnace, but it could be in any convenient form such as anthrafines or crushed bituminous coal having a size, preferably, less than 10 mesh;

The amount of initial cost of the apparatus suitable for carrying the process into practice would be significantly less than the typical two-step process employing the blast furnace to make iron, and a second furnace for making steel, because the process of our invention comprises one step, and because the size of the single furnace would be much smaller for a given capacity as a result of the comparatively rapid, high temperature reaction between dissolved carbon, molten metal, and the heated iron oxides;

Mixing and intimate contact of the reacting materials is good, especially when such materials are injected into the furnace by means of a jet or jets;

The process can be easily stopped and then restarted because the electric furnace arcs can be used initially to melt scrap to form a molten pool of metal in the furnace;

By exercising careful control over the temperature and the oxygen potential in the furnace, the product teeming therefrom can be molten steel rather than molten iron; and The process is continuous.

Although the invention has been described herein with a certain degree of particularity, it is understood that the present disclosure has been made only as an example and that the scope of the invention is defined by what is hereinafter claimed.

What is claimed is:

1. A direct reduction process for making steel comprising the steps of:
   a. moving iron oxides into a first container at a flow rate per hour between 13,000 and 140,000 pounds;
   b. flowing hot gases into said container and into contact with said iron oxides;
   c. partially reducing said iron oxides in said first container;
   d. moving the partially reduced iron oxides into a second container;
   e. flowing carbon monoxide and hydrogen into said second container and into contact with said partially reduced iron oxides;
   f. flowing the partially reduced iron oxides and fine particulate carbon having a mesh size less than 10 at a flow rate between 4,000 and 50,000 pounds per hour and the carbon monoxide and hydrogen into a furnace wherein there is a pool of molten metal that is at a temperature between 2750° and 3100° F;
   g. bringing the materials entering said furnace into contact with the molten metal whereby the iron oxides are reduced directly to steel;
   h. flowing flux material at a rate per hour between 1,000 and 11,000 pounds into the furnace and into contact with the materials in said furnace; and
   i. providing heat within said furnace to enhance the reduction of said iron oxides.

2. The method of claim 1 including the steps of:
   a. melting scrap metal in an electric arc furnace to form an initial pool of molten metal; and
   b. maintaining an electric arc in said furnace for supplying the heat necessary to reduce said iron oxides.

3. The method of claim 1 wherein the step of flowing partially reduced iron oxides and carbon comprises:
   a. injecting said fine particulate carbon and partially reduced particulate iron oxides into said furnace.

4. The method of claim 1 including the steps of:
   a. tapping slag from said furnace; and
   b. tapping molten steel from said furnace.

5. The method of claim 1 wherein the step of flowing hot gases into said first container comprises:
   a. flowing hot gases from said furnace into said first container.
6. A direction reduction process for making steel comprising steps of:
   a. moving iron oxides into a first container at a flow rate per hour between 13,000 and 140,000 pounds;
   b. flowing hot gases from an electric arc furnace into said first container and into contact with said iron oxides;
   c. partially reducing said iron oxides in said first container;
   d. flowing the partially reduced iron oxides into a second container;
   e. generating carbon monoxide and hydrogen gases;
   f. flowing said carbon monoxide and hydrogen gases into said second container;
   g. flowing said partially reduced iron oxides and fine particulate carbon having a mesh size less than 10 at a flow rate per hour between 4,000 and 50,000 pounds under pressure into said electric arc furnace thereby bringing the materials entering the furnace into contact with a quantity of molten metal having a temperature in the range of 2750° and 3100° F therein and reducing the iron oxides to steel;
   h. introducing flux at a flow rate per hour between 1,000 and 11,000 pounds into said electric furnace and forming slag on the molten metal therein;
   i. tapping slag and molten steel from said furnace; and
   j. flowing hot gases from said furnace into said first container for partially reducing said iron oxides.
7. The invention of claim 6 wherein the step of generating carbon monoxide and hydrogen comprises:
   a. flowing natural gas and steam into a reformer and producing therein carbon monoxide and hydrogen.
8. The invention of claim 6 including the step of:
   a. flowing gases from said first container into a cooler.
9. A direct reduction process for making steel using an electric arc furnace that includes the steps of partially reducing iron oxide particles and thereafter contacting the partially reduced iron oxide particles with carbon monoxide and hydrogen, wherein the improvement comprises: thereafter
   a. injecting said partially reduced iron oxide particles and fine carbon particles having a size that is less than 10 mesh into a said furnace containing molten iron at a flow rate per hour of between 4,000 and 50,000 pounds.
10. In a direct reduction process for making steel, the improvement comprising:
    a. injecting fine carbon particles having a size less than 10 mesh and iron oxides into a furnace containing molten metal having a temperature between 2750° and 3100° F.,
    b. introducing flux material into said furnace at a flow rate between 1,000 and 11,000 pounds per hour; and
    c. supplying heat within said furnace whereby said iron oxides are converted into molten steel.
11. The process of claim 10 including the steps of:
    a. separately controlling the rate of flow of carbon particles and the iron oxides into said furance; and
    c. controlling the temperature within said furnace.
12. The process of claim 10 including the steps of:
    a. flowing gases emanating from said furnace into a container through which pass said iron oxides and from which said iron oxides emerge in partially reduced form, and from which gases emerge; and
    b. flowing said gases into a cooler.
13. A process for producing between 100 and 1000 tons of molten steel per day continuously comprising:
    a. continuously moving iron oxides and flux and carbon in fine particulate form into a receptacle containing molten iron whereby said iron oxides and carbon react with said molten iron at the flow rates of:

TABLE I

| Steelmaking Capacity - Net tons per day | Flow rate - pounds per hour | | |
|---|---|---|---|
| | Carbon | Flux | Iron oxide |
| 100 | 4,000–5,000 | 1,000–1,100 | 13,000–14,000 |
| 500 | 20,000–25,000 | 5,000–6,000 | 65,000–70,000 |
| 1000 | 40,000–50,000 | 10,000–11,000 | 130,000–140,000. | b. providing heat within said receptacle for enhancing said reaction whereby said iron oxides are continually reduced to molten steel.
14. The process of claim 13 wherein:
    a. the step of continuously moving iron oxides and flux and carbon materials into a receptacle includes using air to accomplish such step.
15. The process of claim 13 including the steps of:
    a. removing gases generated in said receptacle; and
    b. bringing said gases into contact with said iron oxides whereby they are partially reduced.
16. The process of claim 15 including the step of:
    a. continuously teeming slag and steel from said receptacle.
17. A direct reduction process for making between 100 and 1000 tons of steel per day comprising the steps of:
    a. moving iron oxides from one location into a first receptacle;
    b. moving particulate carbon having a particle size of less than 10 mesh from a second location into said receptacle;
    c. maintaining molten iron at a temperature between 2750° and 3100° F in said receptacle;
    d. bringing said iron oxides and carbon into reaction with said molten iron whereby said iron oxides are reduced to molten steel;
    e. generating heat within said receptacle for enhancing said reaction;
    f. moving flux at a flow rate in the range of between 1,000 and 11,000 pounds per hour into reaction with said molten iron;
    g. flowing gases generated within said receptacle into a second receptacle;
    h. cooling said gases in said second receptacle; and
    i. teeming molten steel from said first receptacle.
18. The process of claim 17 including the steps of:
    a. forcibly moving said iron oxides into said first receptacle;
    b. forcibly moving said particulate carbon into said first receptacle;
    c. forcibly moving flux into said first receptacle; and
    d. teeming slag from said first receptacle.

* * * * *